J. P. HOFFMANN.
HORSE COLLAR.
APPLICATION FILED MAR. 22, 1913.
1,092,120.
Patented Mar. 31, 1914.
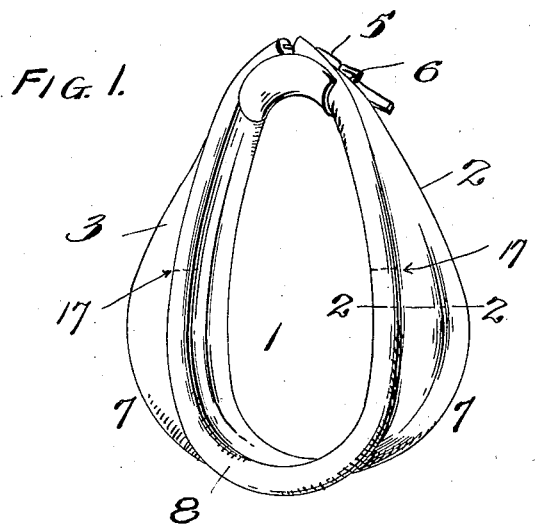
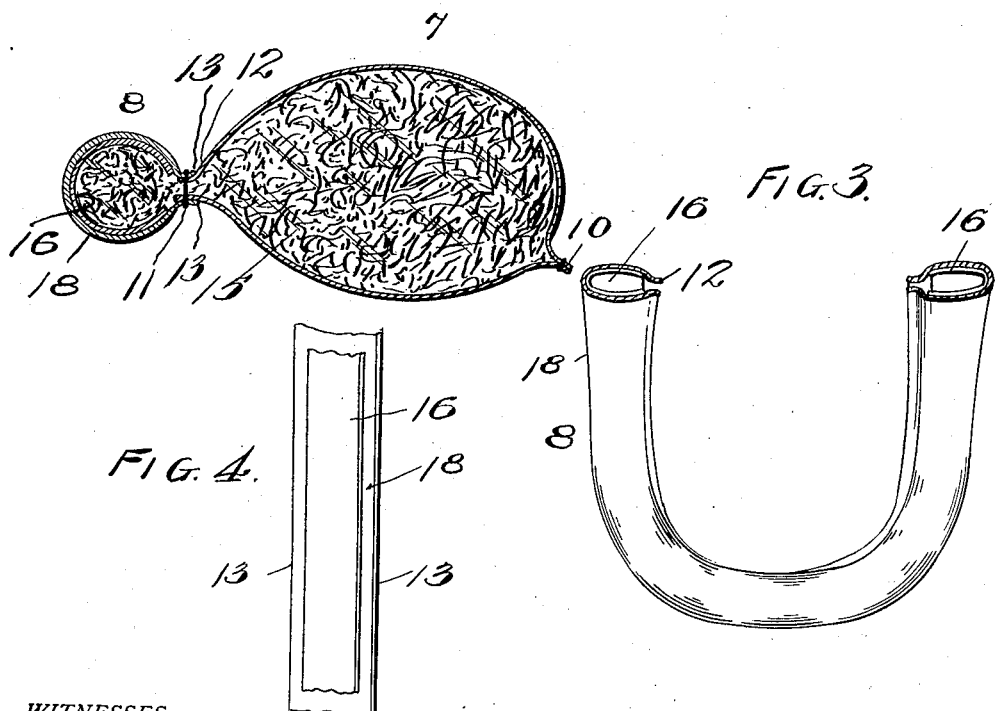
WITNESSES
C. K. Davies
M. L. Newcomb
INVENTOR
J. P. Hoffmann,
By Wm. E. Boulter Attorney

UNITED STATES PATENT OFFICE.

JOHN PAUL HOFFMANN, OF DUBUQUE, IOWA.

HORSE-COLLAR.

1,092,120.

Specification of Letters Patent. Patented Mar. 31, 1914.

Application filed March 22, 1913. Serial No. 756,262.

*To all whom it may concern:*

Be it known that I, JOHN PAUL HOFFMANN, a citizen of the United States, residing at Dubuque, in the county of Dubuque and State of Iowa, have invented certain new and useful Improvements in Horse-Collars, of which the following is a specification.

My invention relates to horse-collars and among the objects in view is to provide a horse-collar which will be sufficiently rigid in the center or throat portion to prevent the collar from opening too far when being adjusted upon or taken off the animal, and to strengthen the said portion of the collar to such an extent that the collar will not break at the center, such breaking being usually caused by the opening of the two side sections too far apart when unbuckled.

This invention consists in the novel construction, arrangement and combination of parts as hereinafter fully described, illustrated in the drawing, and pointed out specifically in the claim.

In the drawing: Figure 1 is a front elevation of a horse-collar constructed according to my invention. Fig. 2 is an enlarged horizontal sectional view on line 2—2 of Fig. 1. Fig. 3 is a detail perspective view of a portion of the collar. Fig. 4 is an enlarged detail plan view of a portion of the collar.

In the drawings, 1 indicates the collar which, as usual, is shaped to fit over the neck of the animal and comprises the side portions 2 and 3 which join to form in effect a single continuous member. The side portions are adapted to be drawn closely together at the top so as to more or less snugly fit the neck of the animal and to be secured in adjusted position by means of a strap 5 and buckle 6, for instance.

Each side portion comprises the main or body portion 7 or after-wale and the roll portion or fore-wale 8. The body portion may be made of two sections of flexible material, as leather, stitched together at 10 and adapted to receive a filling 15 of suitable soft, flexible material, as straw, hair or the like. The roll portion or fore-wale 8 is constructed of flexible material, as leather, and the edges 13 of the roll are stitched at 11 to the ends 12 of the body portion, which ends 12 are embraced by the ends 13 of the roll. The roll is adapted to receive a filling of straw, hair or the like similarly to the body portion.

As far as described the construction of the collar does not differ materially from the usual construction of collars, and which possesses the disadvantage of being liable to break at the throat or center when the side portions are sprung apart to permit the collar to be adjusted upon or taken off the neck of the animal.

With a view of overcoming the stated disadvantage of the usual construction, I so construct the roll portion of the collar that the latter will be strengthened at the central or throat portion, and while permitting the collar to be sprung apart without danger of breaking at the throat portion, will also have a certain springiness or resiliency tending to restore the collar to normal shape. For carrying out the stated object I employ any material, preferably rawhide, which will soften by immersion in water and become pliable to permit it to be bent into proper shape. I employ a strip 16 of the rawhide of any desired length but preferably of a length to extend around the throat portion and up the side portions to points indicated by dotted lines 17 in Fig. 1. I do not desire to be restricted to this limitation in the length of the strip as I may extend it to the upper ends of the side portions.

In constructing the roll portion of the collar I cut the strip 16 somewhat narrower than the strip 18 which forms the exterior of the roll, and after immersing the strip 16 in water until it becomes very pliable it is laid upon the strip 18, leaving the lateral projecting edges 13 on said strip 18 and the two strips are then bent into the desired shape (approximately tubular) with the strip 16 on the inner side of strip 18, and the edges 13 of strip 18 are stitched at 12 to the body portion 7. The edges of strip 16 are left free and lie free from the ends 12 of the body portion and the ends 13 of strip 18.

When the strip 16 has dried it becomes practically rigid and yet has a certain resiliency which tends to restore the collar to its proper shape after being sprung apart. By reason of the rigidity of the strip 16, the central or throat portion of the collar is strengthened so that it may be sprung apart without danger of breaking at the center and it also tends to limit the degree to which the collar may be sprung open.

What I claim is:

In a horse-collar, a roll portion comprising a strip of flexible material bent into roll form, a strengthening strip of rawhide bent into approximately tubular shape upon the inner side of the first-mentioned strip and being narrower than the latter to leave projecting edges on said first-mentioned strip, and a filling of soft, flexible material within the bent rawhide strip.

In testimony whereof I affix my signature in presence of two witnesses.

J. PAUL HOFFMANN.

Witnesses:
ALEX SIMPLOT,
MARTHA KUMPF.